(12) United States Patent
Chung

(10) Patent No.: US 6,302,135 B1
(45) Date of Patent: Oct. 16, 2001

(54) WATER FAUCET CONTROL VALVE

(75) Inventor: Chin-Tang Chung, Chang Hua Hsien (TW)

(73) Assignee: Shong I Copper Co., Ltd., Chang Hua Hsien (TW)

(*) Notice: Subject to any disclaimer, the term of this patent is extended or adjusted under 35 U.S.C. 154(b) by 0 days.

(21) Appl. No.: 09/651,274

(22) Filed: Aug. 30, 2000

(51) Int. Cl.[7] .............................. F16K 27/04; G05D 11/03
(52) U.S. Cl. ................ 137/100; 137/315.09; 137/315.11
(58) Field of Search ..................... 137/98, 100, 315.09, 137/315.11

(56) References Cited

U.S. PATENT DOCUMENTS 6,012,476 * 1/2000 Ko ............................................. 137/98
6,029,687 * 2/2000 Chang ..................................... 137/98
6,182,682 * 2/2001 Chen .................................. 137/315.04

* cited by examiner

Primary Examiner—Stephen M. Hepperle
(74) Attorney, Agent, or Firm—Rosenberg, Klein & Lee

(57) ABSTRACT

A water faucet control valve comprises a valve and a control section seating in an oval mixed chamber of the valve. The valve comprises a pair of studs next to the chamber. The valve has an outlet for cold-hot-mixed water to flow there through. A pair of pin holes are formed next to the water outlet. The cold-hot water control section comprises a left and a right cups being isolated by a partitioner and a mobile axle. The left and right cups are in semi-circular post shape, each has a hole for the partitioner and the mobile axle to insert therein. Both the left and right cups, the partitioner, the mobile axle have separated cold and hot water passages, this has reduced the cost of manufacture and more feasibility.

3 Claims, 5 Drawing Sheets

WATER FAUCET CONTROL VALVE

FIELD OF THE INVENTION

This invention relates to a water faucet, and more particularly to a faucet having a cold-hot water flow control for easy installation to control water flow.

BACKGROUND OF THE INVENTION

One of the conventional water faucets, as shown in FIG. 1, the cold-hot water flow control 1 was installed in a water faucet 2 and secured by a nut 3. This design has the cold-hot water faucet formed integrally which is able to control cold or hot water and the amount of water flow as well.

FIG. 2 has shown an integral cold-hot water control safety valve 1 having a cold-hot water control valve 1a and a water flow control 1b of a conventional faucet. The cold-hot water control valve 1a has a cap, a base and a control section which includes a partitioner and a control axle. Although this design prevents a sudden water temperature change, it is complicated in installation.

SUMMARY OF THE INVENTION

It is the primary object of the present invention to provide a water faucet control valve which uses less parts, thus it is easy to install and has less cost in manufacture.

It is another object of the present invention to provide a water faucet control valve which is designed to install with a water control valve of different specifications.

It is a further object of the present invention to provide a water faucet control valve which is solid and is lasting.

DETAILED DESCRIPTION OF THE PREFERRED EMBODIMENT

Figure 1:
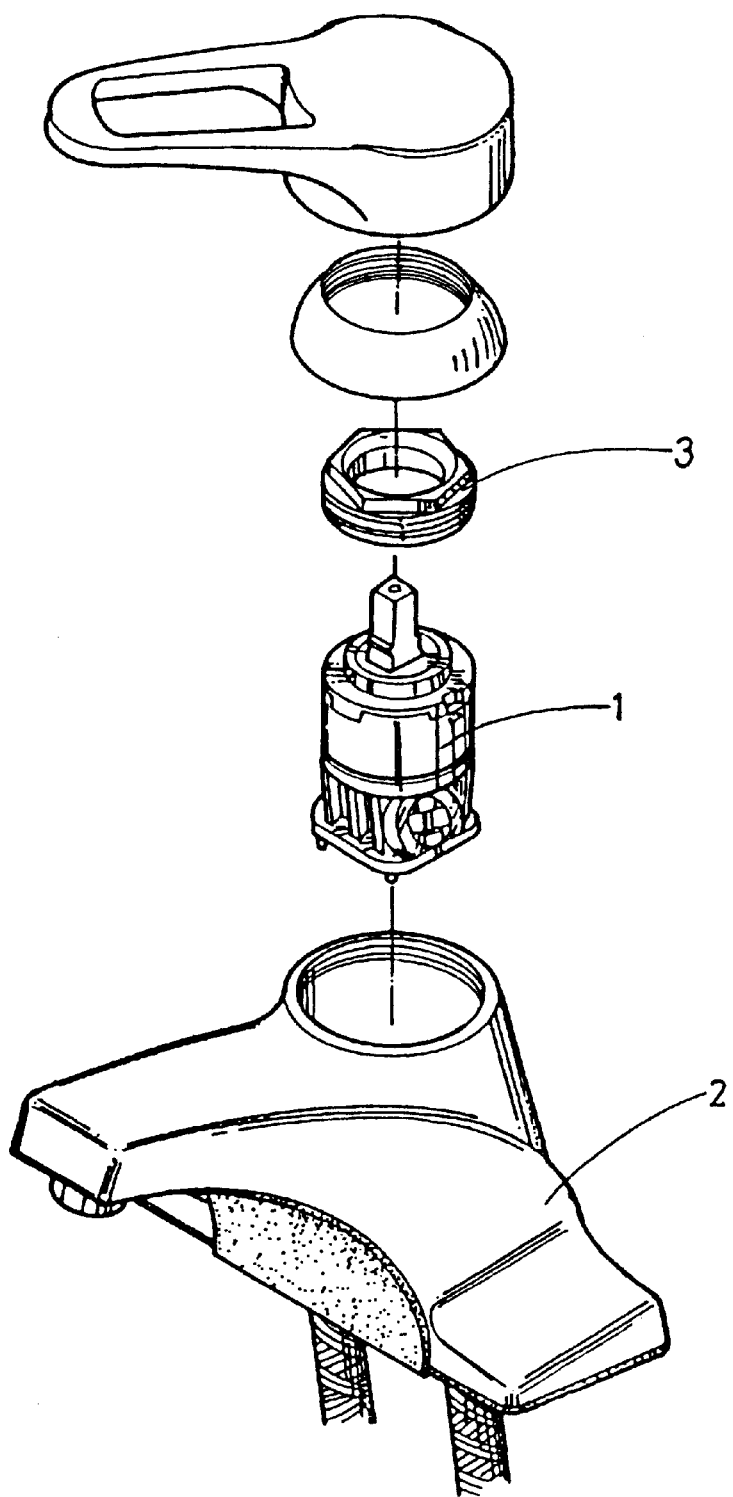
FIG. 1 is an exploded view of a water faucet of a prior art.
Figure 2:
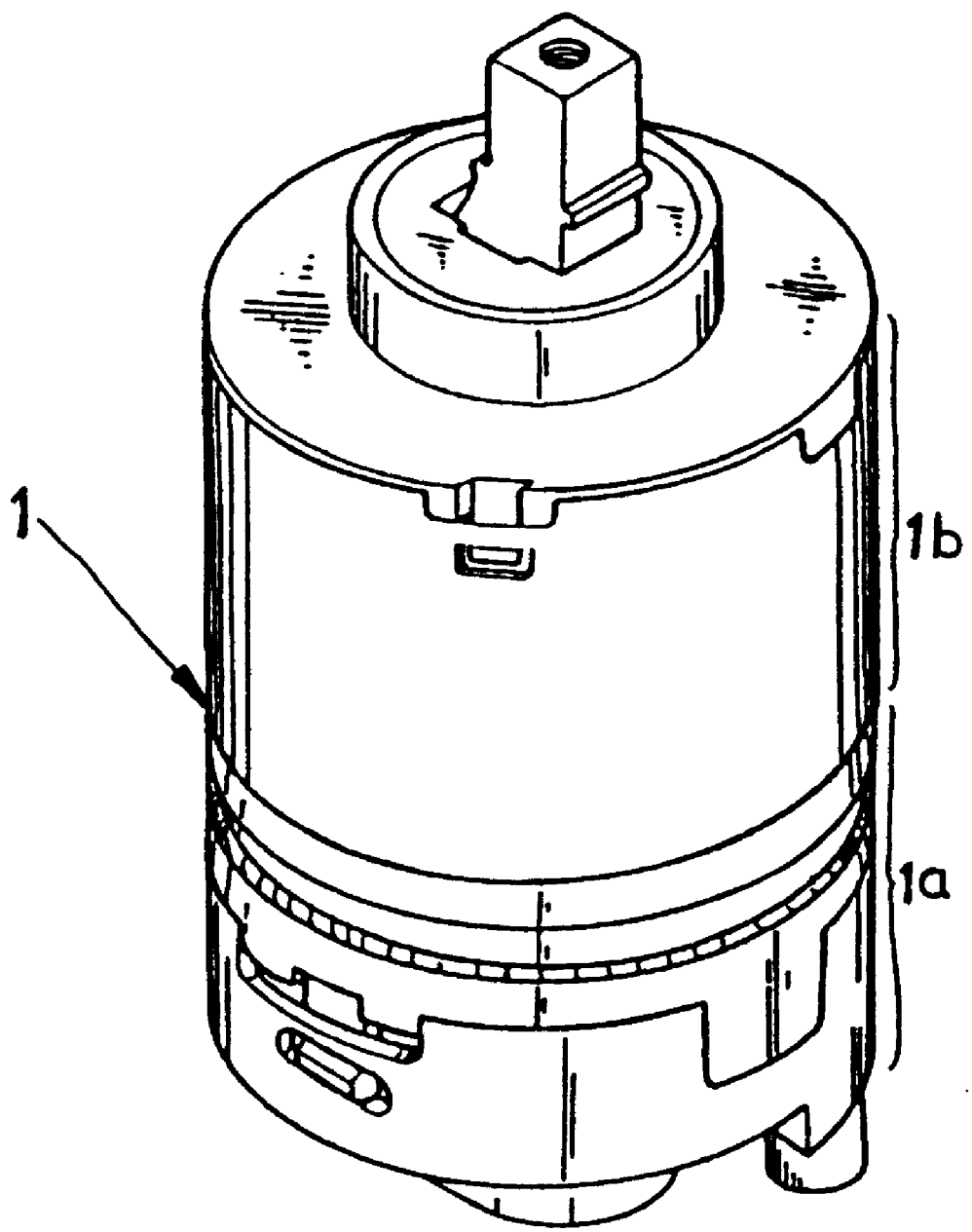
FIG. 2 is a view of a cold-hot water safety control valve of a prior art.
Figure 3:
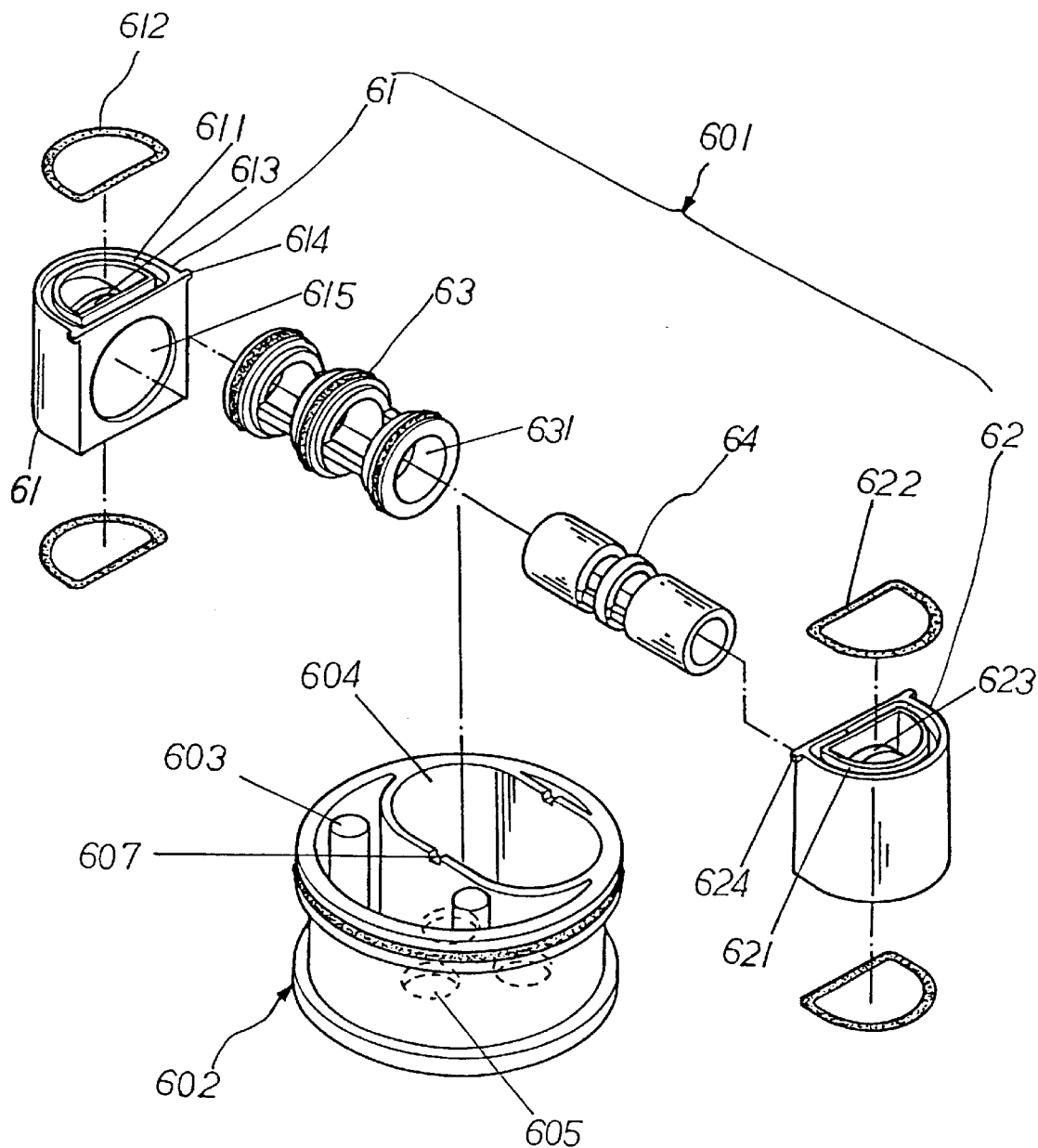
FIG. 3 is an exploded view of a cold-hot water control valve of the present invention.

A water faucet of the present invention, as shown in FIG. 3 comprises a cold-hot control valve 60 which comprises a valve 602, a cold-hot water flow control 601. The valve 602 has an oval mixture chamber 604 at one upper end to accommodate the cold-hot water flow control 601 therein. A pair of notches 607 are formed on the respect upper edges of the chamber 604. A pair of pins 603 are formed within the valve 602 next to the chamber 604. A pair of water holes 605 are formed on the opposite end with respect to the chamber 604 and are interconnected with the chamber 604 for cold and hot water to run through the holes, respectively. A pair of pin holes 606 are formed next to the water holes 605, respectively.

The cold-hot water flow control 601 is formed by a left cup 61, a right cup 62, a partitioner 63 and a mobile axle 64. The left cup 61 and the right cup 62 are in a semi circular shape corresponding to each other. Each of the cups 61 and 62 has a pair of washer seats 611 and 621 on the top and the bottom, respectively to receive washers 612 and 622 therein. A hole 615 is formed on a flat side of each the left cup 61 and the right cup 62, respectively for forming the partitioner 63 and the mobile axle 64 to insert therein. The partitioner 63 is a hollow tube for the mobile axle 64 to insert and to slide manner therein. Each of the left and the right cups 61 and 62 comprises a pair of lips 614 and 624 that will fit into the notches 607 of the mixture chamber 604.

The cold-hot water flow control 601 comprises water inlet holes 613 and 623 for cold and hot water to flow there through.

Figure 4:
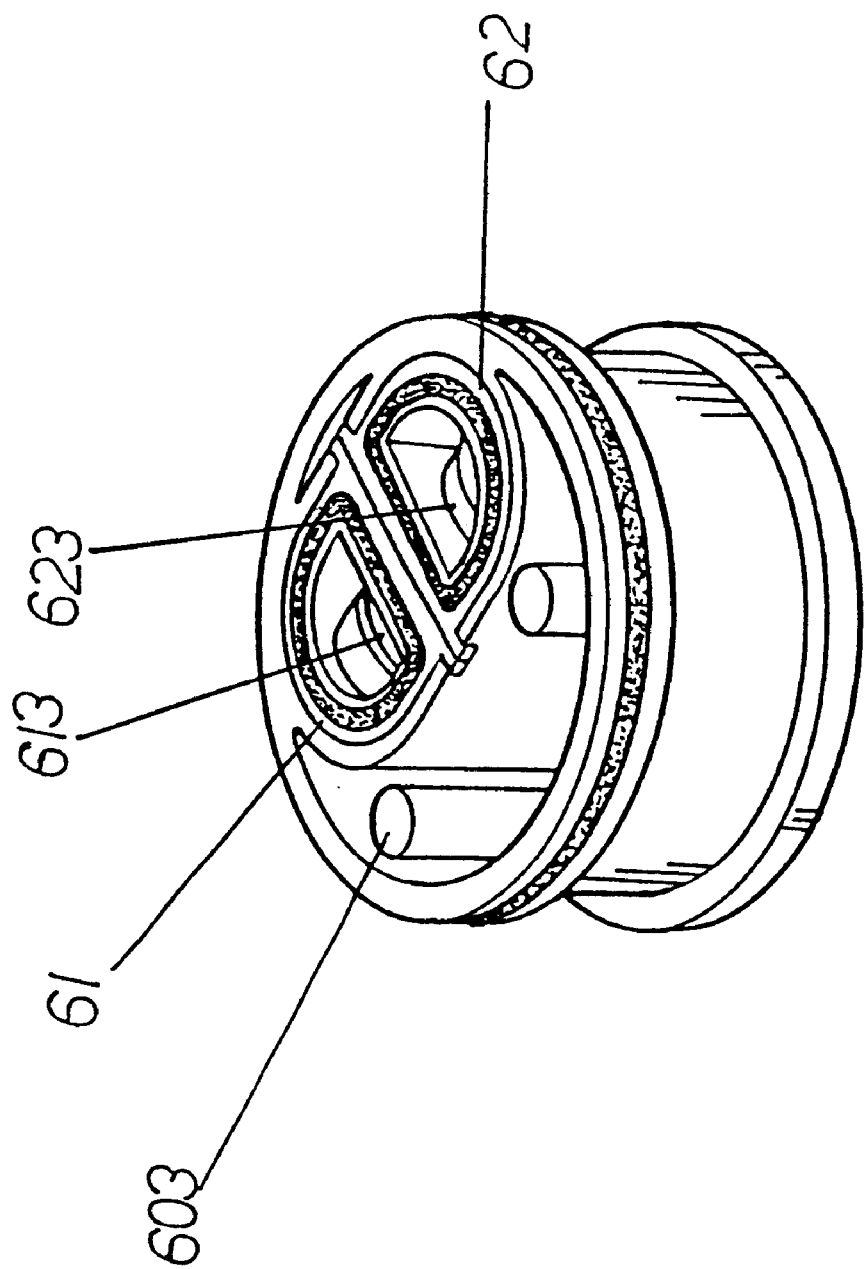
FIG. 4 is a perspective view of the cold-hot water control valve, shown in FIG. 3 of the present invention.
Figure 5:
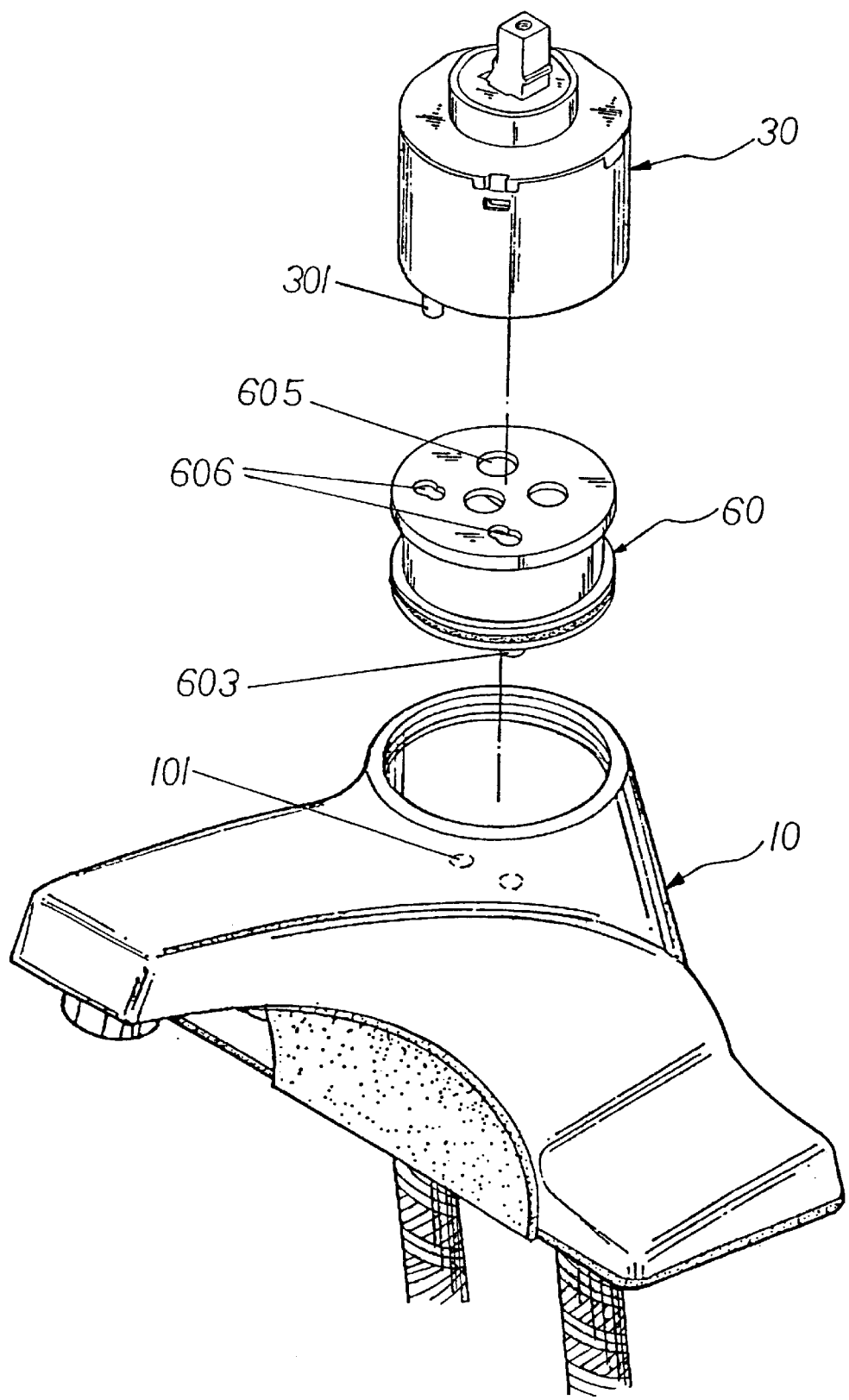
FIG. 5 is an exploded view of a water faucet of the present invention.

In assembly, as shown in FIGS. 4 and 5, the mobile axle 64 is inserted into the hollow tube of the partitioner 63, then the two ends of the partitioner 63 are inserted into the holes 615 of the left cup 61 and right cup 62. The left cup 61 and the right cup 62 are placed into the mixture chamber 604 with the lips 614 and 624 inserted into the notches 607. A water control valve 30 is secured to the valve 60 by inserting a pin 301 into the pin hole 606 of the salve 60, and the two pins 603 are inserted into pin holes 101 of the faucet 10, thus the installation of the faucet is completed.

I claim:

1. A water faucet control valve comprising a valve and a cold-hot water flow control, and the improvements comprising, said valve having an oval mixture chamber at one upper end, a pair of pins being in said valve next to said mixture chamber, the other end of said valve comprising a pair of cold-hot water holes and a pair of pin holes next to said water holes, said cold-hot water flow control comprising a left cup, a right cup, a partitoner and a mobile axle, wherein said left cup and said right cup being in a semi-circular shape corresponding to each other, a pair of washer seats being formed on the top and the bottom end of said left cup and said right cup, respectively for accommodating washers therein, and a hole being formed on a flat end of said left cup and said right cup, respectively, said mobile axle being inserted into said partitioner which then being inserted with the two ends into said holes of said left cup and said right cup, respectively.

2. The water faucet control valve as recited in claim 1, wherein said left cup and said right cup each has a pair of lips on the top respective ends, and said mixture chamber having a pair of notches on the respective top edges corresponding to said lips of said left cup and said right cup.

3. The water faucet control valve as recited in claim 1, wherein said pin holes of said valve are formed in an oval shape for accommodating water flow control of different size.

* * * * *